United States Patent
Soundararajan et al.

(10) Patent No.: US 9,684,450 B2
(45) Date of Patent: Jun. 20, 2017

(54) PROFILE-BASED LIFECYCLE MANAGEMENT FOR DATA STORAGE SERVERS

(71) Applicant: NetApp, Inc., Sunnyvale, CA (US)

(72) Inventors: Gokul Soundararajan, Sunnyvale, CA (US); Deepak Kenchammana-hosekote, San Jose, CA (US); Lakshmi Narayanan Bairavasundaram, San Jose, CA (US); Ricardo Labiaga, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 14/489,212

(22) Filed: Sep. 17, 2014

(65) Prior Publication Data

US 2015/0081836 A1    Mar. 19, 2015

Related U.S. Application Data

(60) Provisional application No. 62/018,497, filed on Jun. 27, 2014, provisional application No. 62/018,523, (Continued)

(51) Int. Cl.
*G06F 15/167* (2006.01)
*G06F 3/06* (2006.01)
(Continued)

(52) U.S. Cl.
CPC ............ *G06F 3/0604* (2013.01); *G06F 3/067* (2013.01); *G06F 3/0653* (2013.01); *G06F 3/0659* (2013.01); *G06F 3/0662* (2013.01); *G06F 3/0665* (2013.01); *G06F 9/5072* (2013.01); *G06F 2003/0697* (2013.01); *H04L 67/1002* (2013.01); *H04L 67/1008* (2013.01)

(58) Field of Classification Search
CPC .... G06F 3/0659; G06F 3/0601; G06F 3/0604; G06F 3/0653; G06F 3/0662; G06F 3/0665; G06F 3/067; G06F 9/5072; G06F 2003/0697; H04L 67/1002; H04L 67/1008
USPC ......................................................... 709/206
See application file for complete search history.

(56) References Cited

U.S. PATENT DOCUMENTS 6,557,035 B1 * 4/2003 McKnight ........... G06F 11/3452
                                              709/202
7,194,538 B1     3/2007 Rabe et al.
(Continued)

OTHER PUBLICATIONS

Non-Final Office Action on co-pending US application (U.S. Appl. No. 14/489,253) dated Jun. 10, 2016.
(Continued)

*Primary Examiner* — James Conaway
(74) *Attorney, Agent, or Firm* — Klein, O'Neill & Singh, LLP

(57) ABSTRACT

Technology is described for a profile-based lifecycle management for data storage servers. The technology can receive a profile, monitor events emitted by devices of the data storage system, determine based on the monitored events that a device of the storage system matches the indicated condition, and perform the action corresponding to the indicated condition, wherein the action includes managing data stored by the data storage system. The received profile can indicate a condition and an action corresponding to the condition.

20 Claims, 3 Drawing Sheets

Related U.S. Application Data filed on Jun. 27, 2014, provisional application No. 61/878,972, filed on Sep. 17, 2013.

(51) Int. Cl.
*G06F 9/50* (2006.01)
*H04L 29/08* (2006.01)

(56) References Cited

U.S. PATENT DOCUMENTS

| | | | | |
|---|---|---|---|---|
| 7,685,269 | B1* | 3/2010 | Thrasher | G06F 9/4843 709/224 |
| 8,224,993 | B1* | 7/2012 | Brandwine | G06F 1/3203 709/244 |
| 2002/0147511 | A1* | 10/2002 | Eryurek | G05B 23/027 700/80 |
| 2003/0149763 | A1* | 8/2003 | Heitman | G06F 3/0601 709/224 |
| 2004/0054656 | A1* | 3/2004 | Leung | G06F 17/30067 |
| 2004/0073675 | A1 | 4/2004 | Honma et al. | |
| 2004/0243699 | A1* | 12/2004 | Koclanes | H04L 29/06 709/224 |
| 2006/0002705 | A1 | 1/2006 | Cline et al. | |
| 2006/0029097 | A1* | 2/2006 | McGee | H04L 47/10 370/468 |
| 2006/0236056 | A1 | 10/2006 | Nagata | |
| 2007/0074076 | A1* | 3/2007 | Imai | G06F 11/0709 714/26 |
| 2007/0100977 | A1* | 5/2007 | Barry | G06F 21/62 709/223 |
| 2007/0118643 | A1* | 5/2007 | Mishra | H04L 41/082 709/224 |
| 2009/0164660 | A1* | 6/2009 | Abrams | G06F 9/4856 709/236 |
| 2009/0235269 | A1 | 9/2009 | Nakajima et al. | |
| 2010/0125753 | A1* | 5/2010 | Gadher | G06F 11/008 714/26 |
| 2010/0277307 | A1* | 11/2010 | Horton | G06Q 10/06 340/539.11 |
| 2012/0079097 | A1 | 3/2012 | Gopisetty et al. | |
| 2013/0055290 | A1 | 2/2013 | Gaikwad et al. | |
| 2013/0086340 | A1* | 4/2013 | Fleming | H04L 69/40 711/161 |
| 2013/0238795 | A1 | 9/2013 | Geffin et al. | |
| 2014/0089511 | A1* | 3/2014 | McLean | G06F 9/5061 709/226 |
| 2014/0278623 | A1 | 9/2014 | Martinez et al. | |
| 2015/0081871 | A1 | 3/2015 | Labiaga et al. | |
| 2015/0081893 | A1 | 3/2015 | Chadwell et al. | |
| 2015/0261630 | A1* | 9/2015 | Endo | G06F 11/2025 714/4.11 |
| 2015/0304234 | A1* | 10/2015 | Salle | G06F 7/00 709/226 |

OTHER PUBLICATIONS

International Search Report issued on Jan. 30, 2015 in International Patent Application No. PCT/US2014/056156.
Final Office Action on co-pending US application (U.S. Appl. No. 14/489,253) mailed Dec. 1, 2016.
Non-Final Office Action on co-pending US application (U.S. Appl. No. 14/189,077) mailed Apr. 21, 2017.

\* cited by examiner

PROFILE-BASED LIFECYCLE MANAGEMENT FOR DATA STORAGE SERVERS

CROSS-REFERENCE TO RELATED APPLICATION

This application claims the benefit of commonly assigned U.S. Provisional Patent Application Ser. No. 62/018,497, filed on Jun. 27, 2014, and entitled "PROFILE-BASED LIFECYCLE MANAGEMENT FOR DATA STORAGE SERVERS"; U.S. Provisional Patent Application Ser. No. 61/878,972, filed on Sep. 17, 2013, and entitled "FABRIC-ATTACHED STORAGE SYSTEM"; and U.S. Provisional Patent Application Ser. No. 62/018,523, filed on Jun. 27, 2014, and entitled "ACTIVELY RESPONDING TO DATA STORAGE TRAFFIC," the disclosures of which are incorporated herein in their entireties by reference.

BACKGROUND

Virtualization is a computing technique used for creating virtual instances of computing devices rather than physical instances of the computing devices. In hardware virtualization, a host computing device is a physical computing device that hosts virtual (or "guest") computing devices. Virtualization has been applied not only to computing devices and operating systems, but also to networking and storage systems.

Cloud computing is a term used to refer to a model of computing in which multiple computing devices provide various computing services via a network, e.g., an Intranet or the Internet. Cloud computing commonly employs virtualization to provide "virtual servers." Enterprises and other entities may use cloud computing instead of deploying data centers or may use cloud computing to provide supplementary "elastic" computing services. Elasticity is a benefit offered by cloud computing in that computing resources can be scaled up or down on the fly without affecting the end user.

Data storage servers, e.g., devices that provide services offered by storage area networks, are increasingly used in private data centers, cloud computing architectures. Moreover, enterprises may have multiple data storage servers (also referred to simply as "storage servers") in their data center and even multiple data centers. System administrators are commonly called on to provide improved storage services, e.g., by adding, maintaining, or retiring storage servers at appropriate times. However, appropriate management at scale can be difficult. For example, it may be difficult to determine how to configure storage servers to respond to storage demands from users, applications, etc.

DETAILED DESCRIPTION

Figure 1:
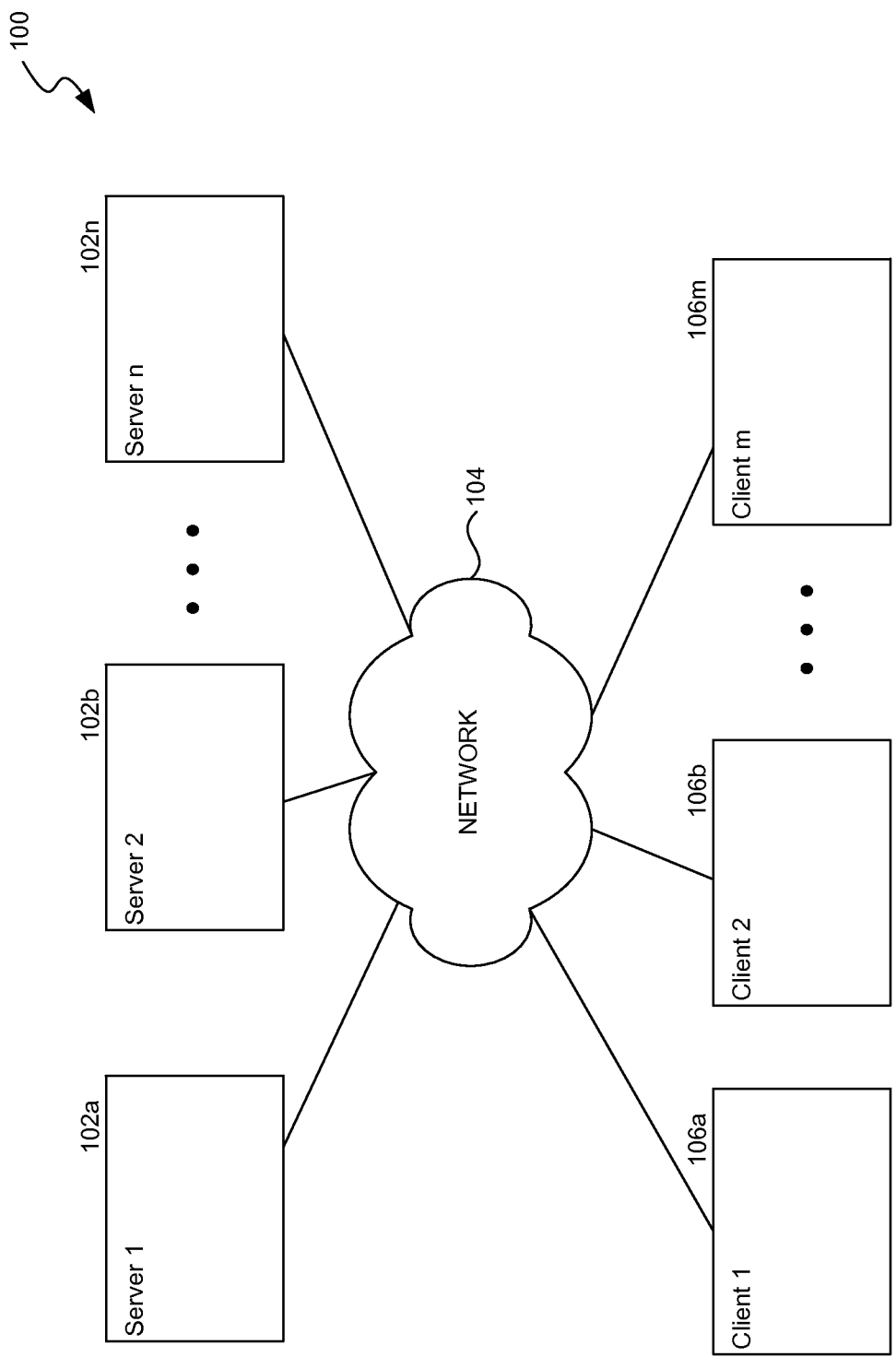
FIG. 1 is a block diagram illustrating various components in an environment in which the disclosed technology may operate in various embodiments.

Profile-based lifecycle management of storage servers and components thereof ("storage devices") is disclosed. A new class of storage devices is interconnected via very high bandwidth connections, e.g., in racks of storage devices, within a data center, or even across data centers. These storage devices form part of a "fabric" and can be configured for use with other storage devices, e.g., in a "cluster" of storage servers or storage devices, to provide increased capacity, reduce latency, or respond to other storage-related needs. Commonly, administrators configure these storage devices manually, e.g., initially during deployment, during reallocation (e.g., to a different cluster), or during decommissioning. However, this can be a time consuming, labor-intensive and error-prone process. The disclosed technology can use profiles to facilitate configuration, reconfiguration, and decommissioning of storage devices.

Various profiles can be defined for applications, e.g., Microsoft Exchange mail servers, database servers, file servers, etc. The profiles can specify conditions and actions. A condition can indicate a target capacity, responsiveness, availability, age, version number, or other storage-related attributes. An action indicates what to do when the condition is met. For example, a profile can specify that if the storage capacity of a server, e.g., an Exchange mail server, is 80% full (a condition), then an additional storage device should be assigned to a cluster and data is to be rebalanced across the augmented cluster (an action). Administrators can install one or more profiles. Alternatively, in the infrequent yet possible case where applications desire bare metal resources (i.e., non-virtualized resources), applications can have associated therewith suggested profiles for optimal performance, e.g., that are approved and installed into a profiles database by administrators.

A monitoring component executing at a computing device can monitor events to determine whether one or more conditions specified by the various profiles has been met. This monitoring component can execute at one or more computing devices, e.g., a management console, a data storage server, or other computing device. Various components of the data storage system can emit events to indicate status, e.g., capacity utilization, bandwidth utilization, errors, etc. alternatively, the monitoring component can query various components for this information. Upon receiving this information, the monitoring component can determine whether one or more conditions have been met. In various embodiments, the first condition that is met is selected. In other embodiments, the conditions may have a priority order and the condition with the highest priority is selected. The monitoring component then triggers the action associated with the condition. Some actions can be taken without human input or involvement. As an example, associating a storage device with a particular cluster may not require human input or involvement. Other actions may require human input or involvement. As an example, permanently decommissioning an out of date storage device may require physically removing the storage device from the network.

The monitoring component may invoke one or more automation layers to cause the actions to occur. As an example, the monitoring component may invoke an application program interface (API) provided by an automation layer executed by a storage device, a storage server, a network device, etc. The API may be provided by a device driver or other software or hardware component. The automation layer can translate invocations of the API to various commands that are issued to devices, e.g., to remove them from an inventory, configure them for a particular use, reset them, return them to the inventory, and so forth.

In various embodiments, the disclosed technology recommends devices for adding to an inventory. As an example, upon receipt of multiple profiles and detection of various events, the technology may predict that one or more various devices may be needed in the future. The technology may then alert a system administrator, e.g., to acquire additional devices and add them to the inventory. As a particular example, the technology may indicate that an additional data storage server may be required to add capacity or reduce latency for a Exchange server installation.

In various embodiments the technology is capable of adapting hardware, installing software, downgrading software to prior versions, etc.

The lifetime of a data storage server has four stages: initialization and/or configuration ("day 0"); provisioning and/or usage ("day 1"); upgrading of hardware and/or software ("day 2"); and decommissioning ("day 3"). The disclosed technology manages this lifetime, e.g., by implementing and managing an inventory of devices, e.g., data storage servers.

In various embodiments, the technology implements methods and systems, comprising receiving a profile, wherein the received profile indicates a condition and an action corresponding to the condition; monitoring events emitted by devices of the data storage system; determining based on the monitored events that a device of the storage system matches the indicated condition; and performing the action corresponding to the indicated condition, wherein the action includes managing data stored by the data storage system. The technology can further comprise receiving multiple profiles; identifying two or more profiles whose conditions are matched by the monitored events; and selecting one of the profiles whose action is to be performed. The condition can specify one or more attributes of the storage system. The specified one or more attributes can be one or more of capacity, performance, deployment time, age, power consumption, version, etc. If the action is to add a device, the method can comprise identifying a device from an inventory of available devices; assigning the identified device to a data storage server; and configuring the assigned device to operate with the data storage server. The method can further comprise transferring, prior to the configuring, data stored at the device to a different device configured to operate with the different data storage server. If the action is to decommission a device, the method can trigger actions to transfer stored data to other devices of a data storage. The method can further comprise deleting data stored at the device to be decommissioned. The method can further comprise placing the decommissioned device into an inventory of available devices. The method can further comprise configuring the device to be no longer assigned to a data storage server with which the device is presently associated.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Turning now to the figures, FIG. 1 is a block diagram illustrating various components 100 in an environment in which the disclosed technology may operate in various embodiments. The components 100 can include one or more server computing devices, e.g., data storage server 102a, data storage server (also, "storage server") and data storage server 102n. The server computing devices 102 are described in more detail below in relation to FIG. 2. The server computing devices 102 can communicate with one or more client computing devices 106 over a network 104. The network 104 can be an intranet, the Internet, or a special-purpose network. Multiple client computing devices 106 (e.g., client computing devices 106a, 106b, and 106m) can communicate with the server computing devices 102, e.g., to store data.

Figure 2:
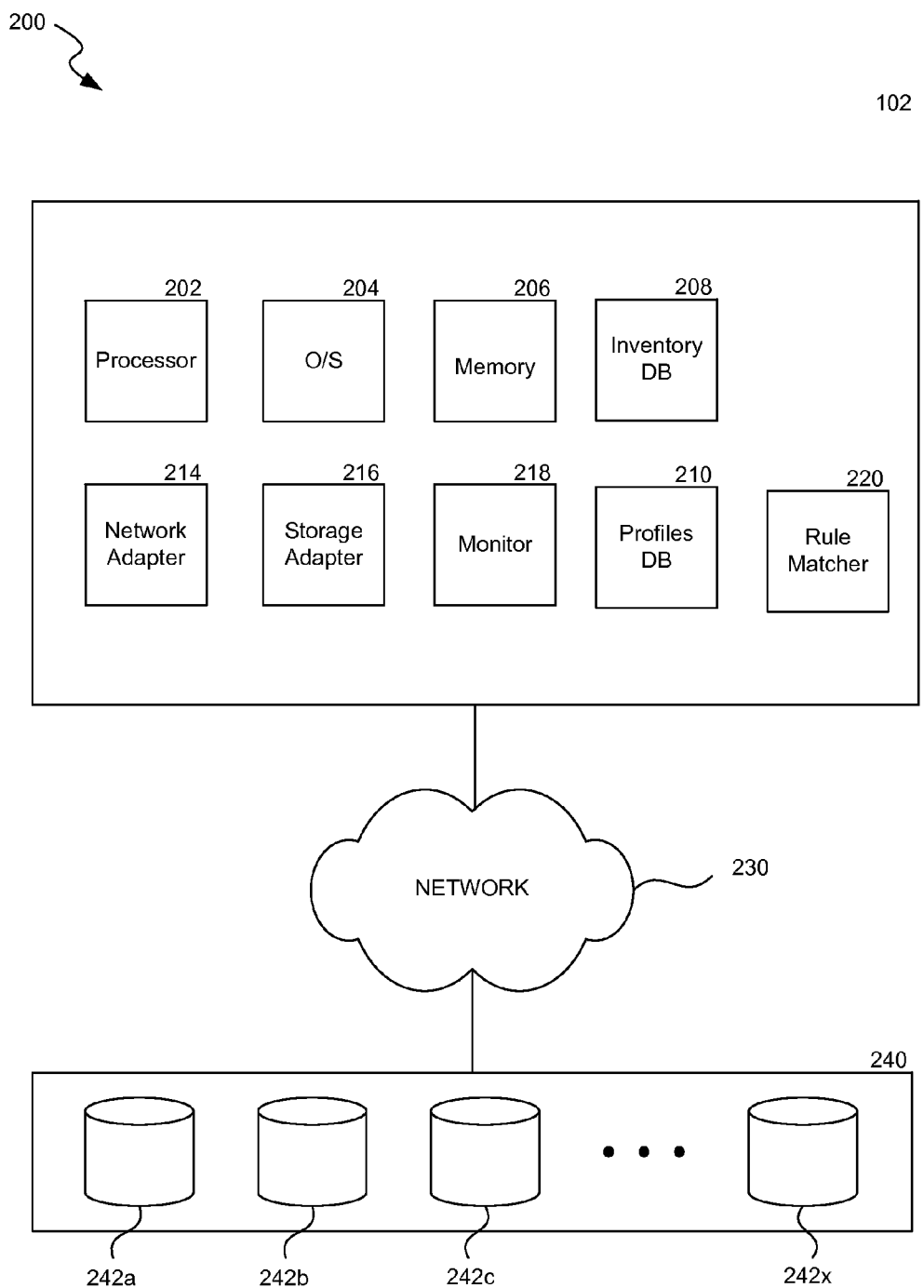
FIG. 2 is a block diagram illustrating various components of a data storage server.

FIG. 2 is a block diagram illustrating various components 200 of a data storage server 102. The data storage server 102 can be referred to as a network storage appliance or "filer" and can be a special-purpose computer that provides file service relating to the organization of information on data storage devices 242, e.g., hard disk drives or solid state drives. The illustrated storage server 102 comprises one or more processors 202 (e.g., single or multi-core processors), memory 206, a network adapter 214, and a storage adapter 216 interconnected by a system bus (not illustrated). The storage server 102 also includes an operating system 204 that implements a file system to logically organize the information as a hierarchical structure of directories and files on data storage devices 242. A processor 202 can cause the storage adapter 216 to read and write data from/to data storage devices 242.

In the illustrative embodiment, the memory 206 has storage locations that are addressable by the processor and adapters, e.g., for storing software program code and/or data. The processor and adapters may, in turn, comprise processing elements and/or logic circuitry configured to execute software code and manipulate data structures. The operating system 204, portions of which are typically resident in memory 206 and/or storage devices, and executed by the processors 202, functionally organizes stored data by, e.g., invoking storage operations in support of a file service implemented by the storage server 102.

The network adapter 214 comprises mechanical, electrical, and signaling circuitry needed to connect the storage server 102 to a client computing device 106 over network 104. The client computing device 106 may be a general-purpose computer configured to execute applications, e.g., a database application. Moreover, the client computing device 106 may interact with the storage server 102 in accordance with a client/server model of information delivery. That is, the client may request the services of the filer, and the filer may return the results of the services requested by the client, e.g., by exchanging data communications packets encapsulating a data communications protocol, e.g., in a common Internet file system (CIFS) protocol or network file system (NFS) protocol format.

The storage adapter 216 can cooperate with the operating system 204 executing on the storage server 102 to access information requested by a client computing device 106. The information may be stored on the data storage devices 242, e.g., in logical "volumes." The storage adapter 216 includes input/output (I/O) interface circuitry that couples to the data storage devices 242 over an I/O interconnect arrangement, e.g., a conventional high-performance, Fibre Channel serial link topology, SAS, SCSI, SATA, etc. The storage adapter 216 can communicate with the data storage devices 242 over a network (or switch) 230. The data storage devices 242 can be housed in an enclosure 240, e.g., in the same rack as the storage server 102 or a different rack.

The data storage server 102 can include an inventory database 208, a profiles database 210, a monitoring component 218, and a rule matcher component 220. The inventory database can store indications of devices, e.g., data storage servers and/or status of those data storage servers. As an example, the inventory database 208 can store indications of data storage servers that are available to be assigned to a cluster. The profiles database 210 can store one or more profiles. Profiles can be added by an administrator, e.g., when installing an application or manually.

Although components 202 are indicated to be associated with a data storage server, they may also or instead be associated with a different type of server, e.g., a management console server.

Figure 3:
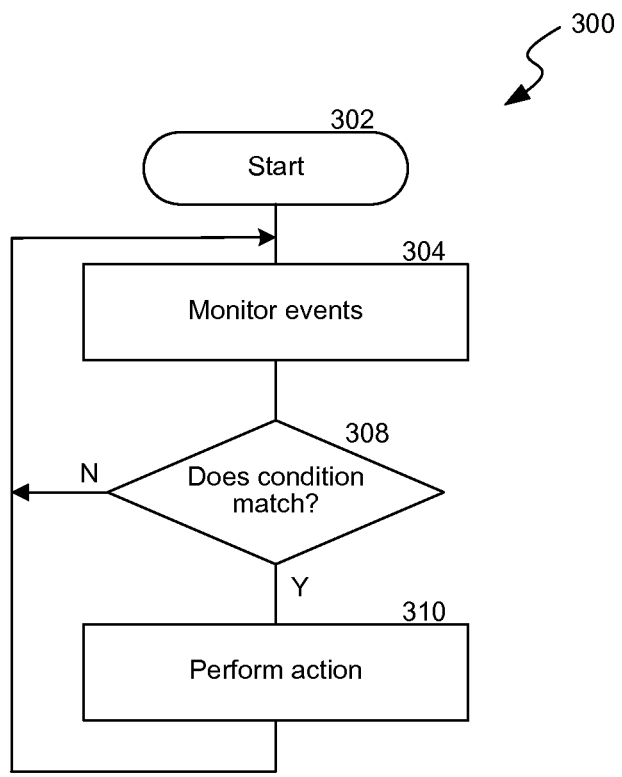
FIG. 3 is a flow diagram illustrating a routine invoked by the disclosed technology in various embodiments.

FIG. 3 is a flow diagram illustrating a routine 300 invoked by the disclosed technology in various embodiments. In various embodiments, the routine 300 can be either continuously executed by the rule matcher component 220 or on-demand by an administrator. The routine 300 begins at block 302. At block 304, the routine monitors events. As an example, various components of storage servers may emit events at various times. Alternatively, a monitoring component can trigger the components of the storage server to emit events. Examples of events can include, e.g., storage utilization, network bandwidth issues, latency issues, errors, etc. At decision block 308, the routine determines whether one or more of the events match conditions indicated by one or more profiles. When more than one rule is matched for a given condition, either an additional priority field is used to decide which order the action(s) will be executed or, in its the actions are executed in order in which it is declared in the profiles database. If true, the routine at block 310 performs an action corresponding to the matched event and returns to block 304. If false, the routine returns to block 304.

Each profile can be specified as a rule-action pair. Some example of rules include:
storage device age>X years
storage device age<X years
storage device hasSupportAgreement
storage device CPU=model X
storage device Memory>=X GB
storage device port type FCoE, 10GigEthernet,
number of storage device ports>=X
storage device CPU>X %
storage device CPU<X %
storage device to media type=HDD, or SSD, or NVMe, etc.
storage device is n-way HA=1, 2, 4, . . .
storage cluster capacity used>X %
storage cluster capacity used<X %
storage device capacity used>X %
storage device capacity used<X %
if storage device software version<X
if storage device software version>X
Examples of actions can include:
evacuate data stored in device
perform non-disruptive upgrade
perform disruptive upgrade
wipe clean
migrate storage device to new cluster
send warning email to administrator
send recommendation email to administrator
send [other] email to administrator Those skilled in the art will appreciate that the logic illustrated in FIG. 3 and described above, and in each of the flow diagrams discussed below, may be altered in a variety of ways. For example, the order of the logic may be rearranged, substeps may be performed in parallel, illustrated logic may be omitted, other logic may be included, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a data storage system, comprising:
receiving a plurality of profiles for a plurality of applications using the data storage system having a plurality of devices for storing data, wherein each received profile for an application indicates a condition associated with the plurality of devices impacting performance of the application and an action corresponding to the condition;
monitoring events emitted by the plurality of devices of the data storage system for life cycle management of the plurality of devices for upgrading, decommissioning and adding devices;
determining based on the monitored events that a first device of the data storage system matches a first indicated condition and a second device of the data storage system matches a second indicated condition associated with an application profile;
comparing a priority of the first indicated condition with a priority of the second indicated condition to determine a higher priority indicated condition based on performance impact on an application associated with the application profile;
performing an action corresponding to the higher priority indicated condition by invoking an application programming interface executed by a device associated with the action, wherein the corresponding action includes managing data stored by the data storage system; and wherein for managing the life cycle of the plurality of devices, in an event the action is to add a device, identifying a device from an inventory of available devices; assigning the identified device to a data storage server; and configuring the assigned device to operate with the data storage server;
predicting based on the plurality of profiles and monitored events future need for one or more devices; and
updating the inventory of available devices, based on the prediction.

2. The method of claim 1, wherein the condition specifies one or more attributes of the storage system.

3. The method of claim 2, wherein the specified one or more attributes is one or more of capacity, performance, or deployment time.

4. The method of claim 1, further comprising:
in an event the identified device is operating with a different data storage server, transferring, prior to the configuring, data stored at the device to a different device configured to operate with the different data storage server.

5. The method of claim 1, wherein in an event the action is to decommission a device, the method further comprising:

causing data stored at the device to be transferred to other devices of a data storage server; and disabling additional data from being stored at the device to be decommissioned.

6. The method of claim 5, further comprising deleting data stored at the device to be decommissioned.

7. The method of claim 5, further comprising placing the decommissioned device into an inventory of available devices.

8. The method of claim 5, further comprising configuring the device to be no longer assigned to a data storage server with which the device is presently associated.

9. A system, comprising: a processor and memory;
a component configured to receive a plurality of profiles for a plurality of applications using the data storage system having a plurality of devices for storing data, wherein each received profile of an application indicates a condition associated with the plurality of devices impacting performance of the application and an action corresponding to the condition;
a monitoring component configured to
monitor events emitted by the plurality of devices of the data storage system for life cycle management of the plurality of devices for upgrading, decommissioning and adding devices;
determine, based on the monitored events, that a first device of the data storage system matches a first indicated condition and a second device of the data storage system matches a second indicated condition associated with an application profile;
compare a priority of the first indicated condition with a priority of the second indicated condition to determine a higher priority indicated condition based on performance impact on an application associated with the application profile;
perform an action corresponding to the higher priority indicated condition by invoking an application programming interface executed by a device associated with the action, wherein the corresponding action includes managing data stored by the data storage system; and wherein for managing the life cycle of the plurality of devices, in an event the action is to add a device, identify a device from an inventory of available devices; assign the identified device to a data storage server; and configure the assigned device to operate with the data storage server;
predict based on the plurality of profiles and monitored events future need for one or more devices; and
update the inventory of available devices, based on the prediction.

10. The system of claim 9, further comprising:
an inventory of available devices, wherein when the monitoring component performs an action to add a device, the monitoring system selects a device indicated by the inventory as available.

11. The system of claim 9, wherein the condition specifies one or more attributes of the storage system.

12. The system of claim 11, wherein the specified one or more attributes is one or more of capacity, performance, or deployment time.

13. The system of claim 9, further comprising:
a component configured to transfer, prior to configuring the assigned device, data stored at the device to a different device configured to operate with the different data storage server, in an event the identified device is operating with a different data storage server.

14. The system of claim 13, wherein in an event the action is to decommission a device, the system further comprising:
a component configured to cause data stored at the device to be transferred to other devices of a data storage server, and to disable additional data from being stored at the device to be decommissioned.

15. The system of claim 14, further comprising a component configured to delete data stored at the device to be decommissioned.

16. The system of claim 14, further comprising a component configured to place the decommissioned device into an inventory of available devices.

17. The system of claim 14, further comprising a component configured to remove the device from assignment to a data storage server with which the device is presently associated.

18. A computer-readable non-transitory storage medium storing computer-executable instructions, comprising:
instructions for receiving a plurality of profiles for a plurality of applications using the data storage system having a plurality of devices for storing data, wherein each received profile for an application indicates a condition associated with the plurality of devices impacting performance of the application and an action corresponding to the condition;
instructions for monitoring events emitted by the plurality of devices of the data storage system for life cycle management of the plurality of devices for upgrading, decommissioning and adding devices;
instructions for determining based on the monitored events that a first device of the storage system matches a first indicated condition and a second device of the storage system matches a second indicated condition;
instructions for comparing a priority of the first indicated condition with a priority of the second indicated condition to determine a higher priority indicated condition based on performance impact on an application associated with the application profile; and
instructions for performing an action corresponding to the higher priority indicated condition by invoking an application programming interface executed by a device associated with the action, wherein the corresponding action includes managing data stored by the data storage system; wherein for managing the life cycle of the plurality of devices, in an event the action is to add a device, instructions for identifying a device from an inventory of available devices; instructions for assigning the identified device to a data storage server; and instructions for configuring the assigned device to operate with the data storage server;
instructions for predicting based on the plurality of profiles and monitored events future need for one or more devices; and
instructions for updating the inventory of available devices, based on the prediction.

19. The non-transitory storage medium of claim 18, wherein in an event the action is to decommission a device, further comprising, instructions for causing data stored at the device to be transferred to other devices of a data storage server; and disabling additional data from being stored at the device to be decommissioned.

20. The non-transitory storage medium of claim 19, further comprising deleting data stored at the device to be decommissioned.

* * * * *